United States Patent
Lee

(10) Patent No.: US 9,028,631 B1
(45) Date of Patent: *May 12, 2015

(54) READHERABLE, REPOSITIONABLE AND REUSABLE ADHESIVE FABRIC PAPER FOR PRINTING AND MANUFACTURING METHOD THEREOF

(71) Applicant: Sang Young Lee, Daegu (KR)

(72) Inventor: Sang Young Lee, Daegu (KR)

(\*) Notice: Subject to any disclaimer, the term of this patent is extended or adjusted under 35 U.S.C. 154(b) by 0 days.

This patent is subject to a terminal disclaimer.

(21) Appl. No.: 14/155,674

(22) Filed: Jan. 15, 2014

(51) Int. Cl.
| | |
|---|---|
| *B29C 65/00* | (2006.01) |
| *B32B 37/00* | (2006.01) |
| *B32B 38/04* | (2006.01) |
| *B32B 27/00* | (2006.01) |
| *B32B 9/00* | (2006.01) |
| *B32B 33/00* | (2006.01) |
| *B32B 37/14* | (2006.01) |
| *D06N 3/00* | (2006.01) |

(52) U.S. Cl.
CPC .............. *B32B 37/14* (2013.01); *D06N 3/0006* (2013.01); *D06N 3/0063* (2013.01)

(58) Field of Classification Search
CPC ........ B29C 65/00; B32B 37/00; B32B 38/04; B32B 27/00; B32B 9/00; B32B 33/00
USPC .......................... 156/148, 278, 269; 428/40.1
See application file for complete search history.

(56) References Cited

U.S. PATENT DOCUMENTS 8,123,893 B2 \* 2/2012 Lee ............................... 156/278

FOREIGN PATENT DOCUMENTS

KR 20110001256 1/2011

\* cited by examiner

*Primary Examiner* — Daniel Lee
(74) *Attorney, Agent, or Firm* — IPLA P.A.; James E. Bame

(57) ABSTRACT

Provided is an adhesive fabric paper that is used in color printers for personal computers, printing machines for indoor and outdoor advertisement, wide format printers, plotters, and so on to print colored images. In the invention, the rear side of the fabric is not subjected to gray coating and white coating, and the front side of the fabric is coated with a coating solution containing at least one fixation-strengthening agent selected from among titanium dioxide, silicon oil, silicon dioxide, polyoxyethylene sorbitan trioleate, and polyvinyl alcohol. The adhesive fabric paper shows the same functions as those of the rear side coating layer and can be manufactured by a simpler process at reduced costs.

2 Claims, 3 Drawing Sheets

READHERABLE, REPOSITIONABLE AND REUSABLE ADHESIVE FABRIC PAPER FOR PRINTING AND MANUFACTURING METHOD THEREOF

BACKGROUND

The present invention relates to a readherable, repositionable and reusable adhesive fabric paper that is used in color printers for personal computers, printing machines for indoor and outdoor advertisement, wide format printers, plotters, and so on to print colored images. The adhesive fabric paper according to the present invention can be easily printed using any printer, can be freely attached to and detached from many places several times, does not leave adhesive residue when it is detached, and does not damage a place where it is adhered (for instance, on a painted wall, on wallpaper, or on an existing advertising medium previously attached to any one place).

Particularly, the adhesive fabric paper according to the present invention can show the same effects as those of a rear side coating layer (gray coating layer or white coating layer), disclosed in a previous patent of the applicant, even though it does not have the rear side coating layer, and can be manufactured by a simpler process at reduced costs.

In general, paper and vinyl are mainly used for printing. However, with the recent development of various advertising techniques, the use of fibrous materials for printing has increased.

Typical examples of the fibrous materials include banners that have recently been used to output images through a wide format printer or a plotter.

However, such conventional fabrics for printing have a problem in that, because one side thereof is merely coated such that it can be printed with images, the degrees of clarity and detail are low due to a low printing quality. Further, the fabric is decolorized rapidly after printing. Also, the fabric requires thermal cutting that is expensive and takes much time since yarns of a cut portion come loose when the fabric is cut as much as a necessary size. In addition, it is inconvenient to attach and remove an advertising thing made of the fabric.

The present inventor previously disclosed a product that overcomes the above-described problems and a manufacturing method thereof (Korean Patent No. 1099813 (Dec. 21, 2011) and U.S. Pat. No. 8,123,893 (Feb. 28, 2012).

The manufacturing method disclosed by the present inventor includes the steps of: heating and rapidly cooling a woven fabric so that its width is shrunk by 10% to 15%; preparing a coating solution to be applied to the front side of the fabric and aging it for 3 days; coating the rear side of the fabric twice with a mixture of polyurethane resin with a white pigment, and coating the rear side once with a mixture of polyurethane resin with a grey pigment; coating the front face of the fabric twice with the prepared coating solution; and laminating an adhesive-coated backing material to the coated fabric.

In the above-described manufacturing method, the reason why the process of coating the rear side of the fabric twice with the polyurethane resin/white pigment mixture and coating the rear side once with the polyurethane resin/grey pigment mixture is performed is to prevent printed images from being decolorized rapidly by the volatile component of the adhesive of the backing material when the adhesive permeates the fabric. Further, the reason is to prevent the yarns of the fabric from becoming loose and to block sunlight (UV light). In addition, the reason is to prevent a background color or an already existing image in any place, to which the product disclosed by the present inventor was attached, from showing through the product.

However, this process of coating the rear side is very expensive and time-consuming, and for this reason, this process needs to be eliminated.

SUMMARY OF THE INVENTION

Accordingly, the present invention has been made in order to solve the above-described problems occurring in the prior art, and it is an object of the present invention to provide an adhesive fabric paper for printing and a manufacturing method thereof, in which the adhesive fabric paper can sufficiently show the above-described functions of the rear side coating layer, even though it does not have the rear side coating layer, and can be manufactured by a simpler process at reduced costs.

To achieve the above object, the present invention provides a method for manufacturing a readherable, repositionable and reusable adhesive fabric paper for printing images, the method comprising the steps of: weaving polyester DTYs (draw textured yarns) to prepare a woven fabric; heating and rapidly cooling the woven fabric to shrink the width of the fabric by 12-17%; coating the front side of the fabric with a coating solution containing at least one fixation-strengthening agent selected from among titanium dioxide, silicon oil, silicon dioxide, polyoxyethylene sorbitan trioleate, and polyvinyl alcohol; aging the coated fabric; and laminating an adhesive-coated backing material to the rear side of the fabric.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION OF THE INVENTION

Figure 1:
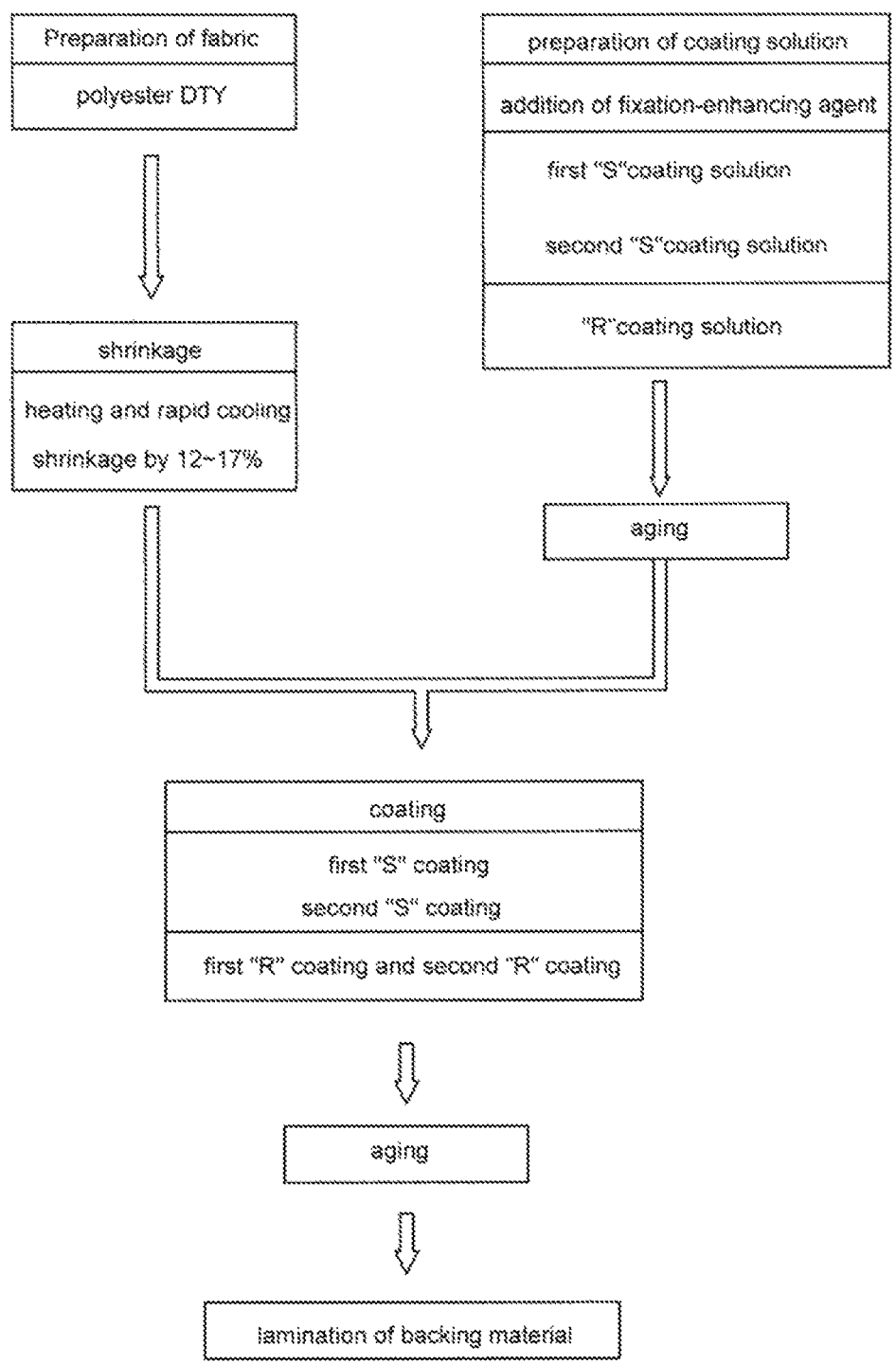
FIG. 1 is a flowchart showing a method for manufacturing an adhesive fabric paper according to the present invention.

Hereinafter, preferred embodiments of the present invention will be described in detail.

The manufacturing method according to the present invention generally comprises the steps of: preparing a fabric; shrinking the fabric; preparing a coating solution; coating the front side of the fabric; and laminating a backing material to the rear side of the fabric.

Each of the steps will now be described in further detail.

1. Preparation of Fabric

A fabric that is used in the present invention is prepared by weaving polyester DTYs (draw textured yarns).

When the fabric woven from polyester DTYs is used, it can more deeply absorb an ink-receiving coating solution than other fabrics in the coating process and enables the coating solution to exist between the yarn strands of the fabric, thereby preventing the coating solution from being separated from the fabric after coating.

Moreover, the fabric woven from polyester DTYs allows a print ink to be evenly and deeply distributed on the coating solution deeply absorbed into the fabric and on the coating solution existing between the yarn strands of the fabric to thereby provide excellent image resolution and vividness.

Specific examples of filaments that may be used to prepare the fabric in the present invention include polyester DTY filaments, polyester DTY satin bright filaments, polyester DTY satin semi dull bright filaments, polyester DTY full dull filaments and the like.

The thickness of the yarn may be selected in the range from 75 denier to 300 denier. In addition, yarns having a thickness larger than 300 denier may also be used, if the fabric density, the degree of shrinkage of the fabric, the thickness of the coating layer, and the like are controlled.

2. Shrinkage

In the next step, the fabric is heated and rapidly cooled so that the width thereof is shrunk. The object of the present invention is to satisfy the requirements of the printing paper without having to coat the rear side. Thus, in the present invention, the fabric is placed in a chamber and maintained in the chamber at a temperature of 180-190° C. for 7-8 hours while supplying steam, followed by cooling. Herein, the cooling process may be a natural cooling process, but is preferably an artificial rapid cooling process employing cold air, the efficiency with which the fabric is shrunk can be increased and the cooling time can be shortened.

By performing this step, the area of the fabric is reduced by 12-17%, and thus the density thereof is increased so that there is no gap between the yarn strands and the fabric is maintained in a very dense state. Thus, the fabric can maintain the functions thereof, even though the rear side thereof is not coated.

3. Preparation of Coating Solution

In the present invention, the following two types of coating solutions may be used: an "S" coating solution for solvent-based ink; and an "R" coating solution for dye-based ink, pigment-based ink and UV ink.

The coating solution is prepared 3 days before use. The reason is to age the coating solution for 3 days and enable different components in the coating solution to react with each other for a sufficient time.

Before use, the coating solution is sufficiently mixed in a container having a central rotating shaft at high speed for 30 minutes. By this mixing process, the viscosity of the coating solution can be sufficiently reduced and the white color thereof can be kept evenly.

In a particular embodiment of the present invention, the "S" coating solution is divided into two different coating solutions: first "S" coating solution; and second "S" coating solution. In addition, the "R" coating solution is applied twice.

The major components of the "S" coating solution and the "R" coating solution are shown in the following tables.

TABLE 1

First "S" coating solution

| Components | CAS NO | Content (wt %) |
|---|---|---|
| Ethylene vinyl acetate copolymer | 24937-78-8 | 40-50 |
| Plasticizer (DOP; di-octyl-phthalate) | — | 1 |
| Titanium dioxide | | 3-8 |
| Water | 7732-18-5 | To make 100 wt % |

TABLE 2

Second "S" coating solution

| Components | CAS NO | Content (wt %) |
|---|---|---|
| Polyurethane resin | 51-79-6 | 20-30 |
| Silicon oil | | 1-5 |
| Silicon dioxide | | 1-5 |
| Methyl alcohol | 67-56-1 | To make 100 wt % |

TABLE 3

"R" coating solution

| Components | CAS NO | Content (wt %) |
|---|---|---|
| Polyacrylate copolymer | 67-56-1 | 10-15 |
| Silicon dioxide (silica)) | 112945-52-5 | 8-12 |
| Polyoxyethylene sorbitan trioleate | | 2-5 |
| Polyvinyl alcohol | | 2-5 |
| Low molecular alcohol | — | To make 100 wt % |

According to the present invention, a fixation-strengthening agent functioning to fix the yarns of the fabric, like the functions of the rear side coating, is added to the surface coating solution disclosed in the previous patent of the present inventor. The fixation-strengthening agent serves to prevent the yarns of the fabric from becoming loose during processing operations such as cutting after manufacture of the adhesive fabric paper. One of the important functions of the rear side coating in the previous patent is to prevent the yarns from becoming loose, but in the present invention, the fixation-strengthening agent is used to strengthen the fixation of the yarns in order to provide the same functions as those of the rear side coating layer without forming the rear side coating layer.

With respect to the fixation-strengthening agent, the first "S" coating solution contains 3-8 wt % of titanium dioxide, the second "S" coating solution contains 1-5 wt % of each of silicon oil and silicon dioxide, and the "R" coating solution contains 2-5 wt % of each of polyoxyethylene sorbitan trioleate and polyvinyl alcohol.

4. Coating Process

In the next step, the fabric surface into which ink is to be absorbed is coated by a two-step coating process. In other words, the fabric surface is either coated once with each of the first "S" coating solution and the second "S" coating solution or coated twice with the "R" coating solution.

The first coating is performed, followed by drying. Then, the second coating is performed, followed by drying.

Compared to the case in which the fabric surface is coated with a mixture of the first coating and second coating solutions by a one-step coating process, the two-step coating process enables the coating solution to uniformly penetrate the fabric and allows the two coating layers to be separated from each other. In other words, the first coating layer serves as a primer coating and functions to fix the second coating solution to the fabric so as not to be detached from the fabric. In addition, the two coating layers on the fabric surface are prevented from being easily decolorized by penetration of water.

Particularly, according to the present invention, each of the coating solutions contains the fixation-strengthening agent. Specifically, the first "S" coating solution contains titanium dioxide as the fixation-strengthening agent and an ethylene-vinyl acetate copolymer functioning as an adhesive. The titanium dioxide in a fine particle state functions to strengthen the fixation and solidification of the ethylene-vinyl acetate copolymer during drying, and this mixture of titanium dioxide and the ethylene-vinyl acetate copolymer deeply penetrates the fabric and the yarns to strengthen the binding force between the yarns of the fabric. This mixture performs the function of the white coating or gray coating layer formed on the rear side of the fabric disclosed in the previous patent of the present inventor.

The titanium oxide functions to strengthen the fixation of the yarns of the fabric and also functions to reduce light reflection, block UV light to prevent yellowness and extend the life span of the coating layer, provide antibacterial activity and prevent contamination.

The second "S" coating layer functions to easily absorb ink and make color true to nature.

Particularly, because the second "S" coating is performed after drying and cooling the first "S" coating solution, it is possible to prevent the second "S" coating solution from being solidified immediately before being distributed uniformly, due to heat that penetrated the fabric in the first "S" coating step. In addition, it is possible to minimize the formation of coating lines on the fabric surface during coating. In other words, compared to the case in which the first and second coating solutions are used in a mixture, in the case in which the first and second coating layers are used separately, the two separate coating layers are formed to prevent the penetration of light, and the effects of each of the coating solutions are maximized, and the second "S" coating layer can be strongly fixed to the first "S" coating layer.

Particularly, according to the present invention, the second "S" coating solution contains silicon oil and silicon dioxide as the fixation-strengthening agents. These components have heat resistance, cold resistance, water repellence and the like, and thus are helpful in maintaining the life span of color images printed on the coating layer. In addition to such functions, these components function to prevent the yarns of the fabric from becoming loose.

In the present invention, the "R" coating solution may be applied in two steps in place of the first and second "S" coating solutions. The reason why the "R" coating solution is applied in two steps is to provide the same effects as those obtained when the first and second "S" coating solutions are applied.

The "R" coating solution of the present invention contains specific amounts of polyoxyethylene sorbitan trioleate and polyvinyl alcohol. These components function to strongly fix the yarns of the fabric in cooperation with silicon dioxide and serve to facilitate the printing of ink and protect printed color images.

After the "S" coating or "R" coating process, the fabric is required to be naturally aged for about 3-4 days.

This aging process is performed in order to prevent the fabric from shrinking on the backing material after lamination to cause curling of the fabric (curling phenomenon) and separation between the fabric and the backing material (tunneling phenomenon).

In other words, because the amount of absorption of water differs between the fabric and the backing material, the curling phenomenon and the tunneling phenomenon occur when the fabric comes into contact with the backing material. For this reason, the fabric is naturally aged for a sufficient time so that the fabric can be prevented from shrinking after the lamination process.

5. Lamination of Backing Material

Lamination of the backing material is carried out by a comma coater.

The major ingredients of a removable adhesive to be applied to the backing material before lamination are shown in Table 4 below.

TABLE 4

| Ingredients | CAS NO | Wt % |
|---|---|---|
| Acrylic polymer | — | 31-35 |
| Ethyl acetate | 147-78-6 | 35-45 |
| Toluene | 108-88-3 | 10-20 |

The backing material coated with the above adhesive is passed through a drying chamber, and then pressed against the fabric surface using rollers to form a laminate. Specifically, the adhesive-coated backing material is laminated directly to the rear side opposite the coated side of the fabric without forming a rear side coating layer.

After the lamination process, the product is aged at a temperature of about 50° C. for about one day, and then subjected to various cutting processes (roll cutting, and re-cutting). Herein, the product is rolled once more in a direction opposite the already rolled direction, and then cut 3-4 hours after the rolling process. In other words, the product rolled in one direction is rolled once more in the opposite direction in order to maintain the smoothness of the finished product at a constant level.

The adhesive fabric paper manufactured according to the present invention has a width reduced by 12-17% compared to that of the polyester DTY (draw textured yarn) fabric as a result of heating and rapidly cooling the yarn fabric.

Figure 2:
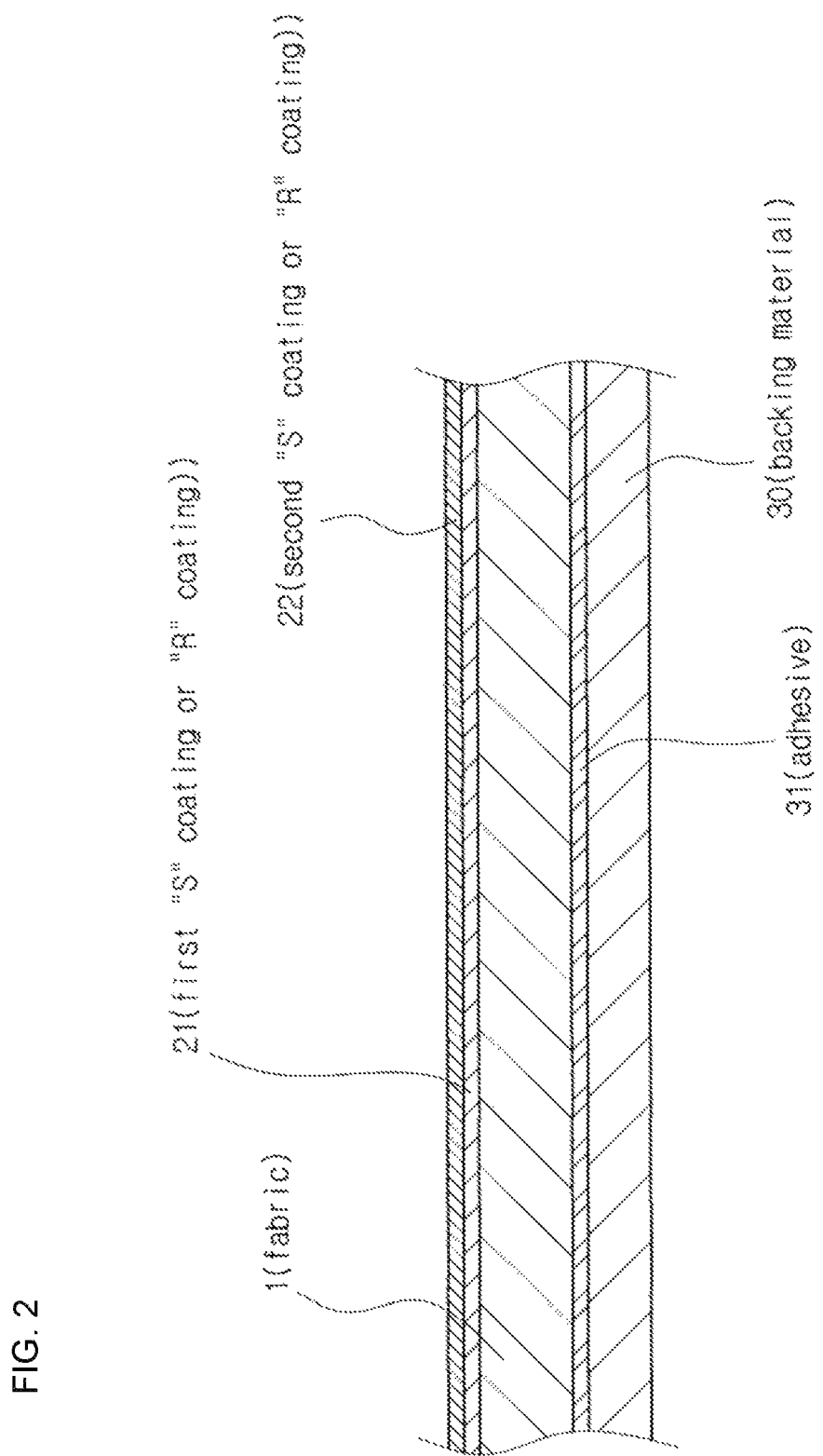
FIG. 2 is an enlarged cross-sectional view of an adhesive fabric paper according to one embodiment of the present invention.
Figure 3:
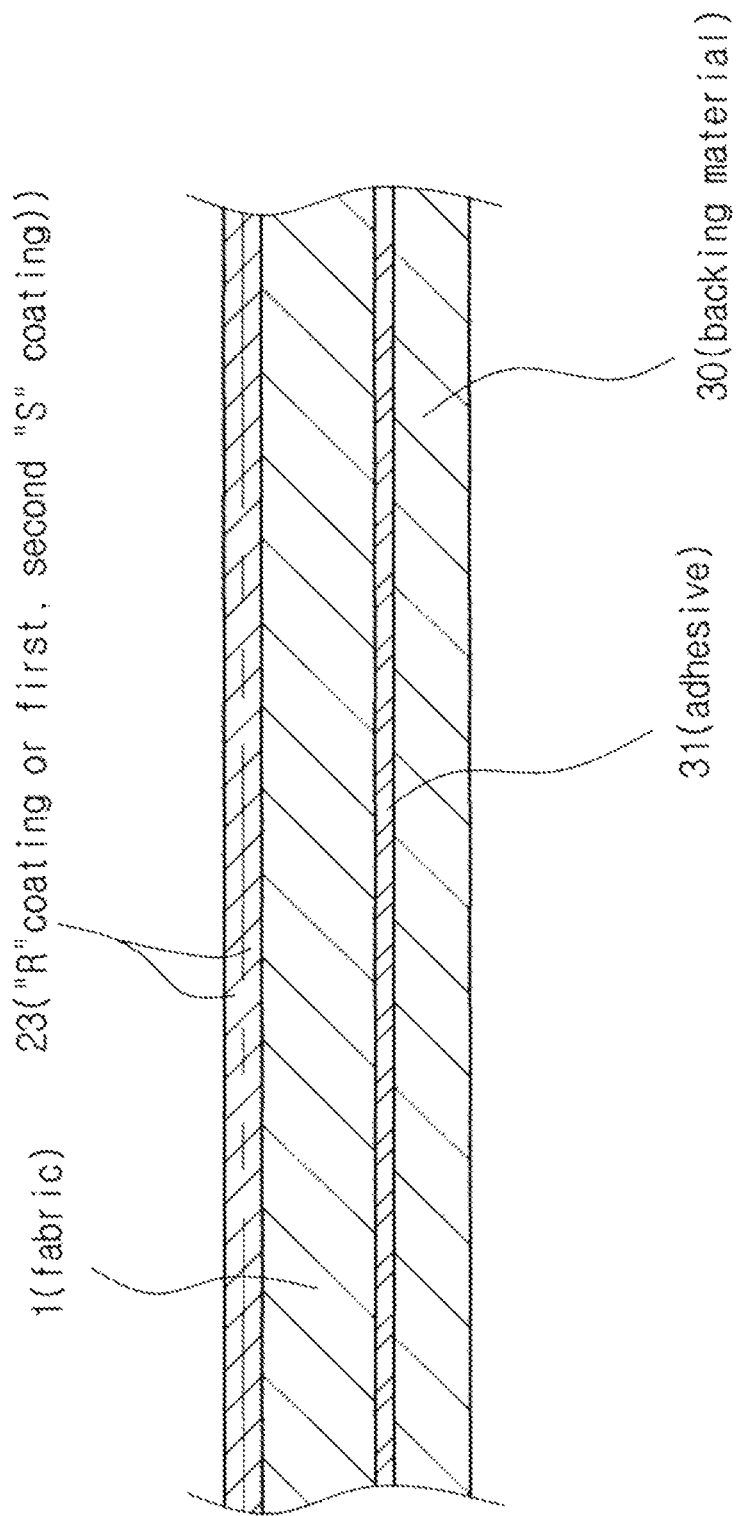
FIG. 3 is an enlarged cross-sectional view of an adhesive fabric paper according to another embodiment of the present invention.

As shown in FIGS. 2 and 3, the structure of the coating layer formed on the surface of a fabric 1 differs between a first embodiment and a second embodiment of the present invention. In the first embodiment, a first "S" coating layer 21 is formed using a coating solution containing 3-8 wt % of titanium dioxide as a fixation-strengthening agent in addition to an ethylene-vinyl acetate copolymer and water as main components, and a second "S" coating layer 22 is formed on the first "S" coating layer using a second "S" coating solution containing 1-5 wt % of each of silicon oil and silicon dioxide as fixation-strengthening agents in addition to polyurethane resin and methyl alcohol as main components.

In the second embodiment, in place of the first "S" coating layer 21 and the second "S" coating layer 22, first and second "R" coating layers 23 are formed by applying an "R" coating solution containing 2-5 wt % of each of polyoxyethylene sorbitan trioleate and polyvinyl alcohol as fixation-strengthening agents in addition to a low molecular alcohol and a polyacrylate copolymer as main components, twice to the fabric 1.

In addition, a backing material 30 coated with an adhesive 31 is laminated to the rear side of the fabric 1.

As described above, the adhesive fabric paper according to the present invention can be easily printed using any printer, can be freely attached to and detached from many places several times, does not leave adhesive residue when it is detached, and does not damage a place where it is attached. In addition, it can be reused several times, is made of a soft material, shows a high image resolution and a very excellent image quality, and prevents printed images from being decolorized. That is, the adhesive fabric paper has all the same effects as those of the previous patent of the applicant. Particularly, even though the adhesive fabric paper of the present invention does not have a white coating layer and a gray coating layer on the rear side, it can show the major functions of the rear side coating layers, including preventing printed images from being decolorized rapidly by the volatile component of the adhesive of the backing material when the adhesive permeates the fabric, preventing the yarns of the fabric from becoming loose, blocking sunlight, and preventing a background color or an already existing image in any place from showing through the product.

Thus, the adhesive fabric paper of the present invention can be manufactured in a simpler process at reduced costs compared to the conventional product while having more excellent properties.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for manufacturing a readherable, repositionable and reusable adhesive fabric paper for printing images, the method comprising the steps of:

weaving polyester DTYs (draw textured yarns) to prepare a woven fabric;

heating and rapidly cooling the woven fabric to shrink the width of the fabric by 12-17%;

coating the front side of the fabric with a coating solution containing at least one fixation-strengthening agent selected from the group consisting of titanium dioxide, silicon oil, silicon dioxide, polyoxyethylene sorbitan trioleate, and polyvinyl alcohol;

aging the coated fabric; and laminating an adhesive-coated backing material directly to the rear side of the fabric, wherein the step of coating the front side of the fabric is performed by applying to the fabric front side a first "S" coating solution containing 3-8 wt. % of titanium dioxide as a fixation-strengthening agent in addition to an ethylene vinyl acetate copolymer and water as main components to form a first "S" coating layer, and applying to the first "S" coating layer a second "S" coating solution containing 1-5 wt. % of each of silicon oil and silicon dioxide as fixation strengthening agents in addition to polyurethane resin and methyl alcohol as main components to form a second "S" coating layer.

2. A method for manufacturing a readherable, repositionable and reusable adhesive fabric paper for printing images, the method comprising the steps of:

weaving polyester DTYs (draw textured yarns) to prepare a woven fabric;

heating and rapidly cooling the woven fabric to shrink the width of the fabric by 12-17%;

coating the front side of the fabric with a coating solution containing at least one fixation-strengthening agent selected from the group consisting of titanium dioxide, silicon oil, silicon dioxide, polyoxyethylene sorbitan trioleate, and polyvinyl alcohol;

aging the coated fabric; and laminating an adhesive-coated backing material directly to the rear side of the fabric, wherein the step of coating the front side of the fabric is performed by applying an "R" coating solution, which contains 2-5 wt. % of each of polyoxyethylene sorbitan trioleate and polyvinyl alcohol as fixation-strengthening agents in addition to a low molecular alcohol and a polyacrylate copolymer as main components, twice to the front side of the fabric.

* * * * *